US011873662B2

(12) United States Patent
Jensen

(10) Patent No.: US 11,873,662 B2
(45) Date of Patent: Jan. 16, 2024

(54) LOCKING DEVICE

(71) Applicant: STENDALS EL AB, Västerås (SE)

(72) Inventor: Lars Jensen, Surahammar (SE)

(73) Assignee: STENDALS EL AB, Västerås (SE)

( * ) Notice: Subject to any disclaimer, the term of this patent is extended or adjusted under 35 U.S.C. 154(b) by 304 days.

(21) Appl. No.: 17/287,313

(22) PCT Filed: Oct. 18, 2019

(86) PCT No.: PCT/SE2019/051024
§ 371 (c)(1),
(2) Date: Apr. 21, 2021

(87) PCT Pub. No.: WO2020/085976
PCT Pub. Date: Apr. 30, 2020

(65) Prior Publication Data

US 2021/0355711 A1 Nov. 18, 2021

(30) Foreign Application Priority Data

Oct. 23, 2018 (SE) .................................... 1851309-3

(51) Int. Cl.
*E05B 55/00* (2006.01)
*E05C 1/06* (2006.01)

(52) U.S. Cl.
CPC ................ *E05B 55/00* (2013.01); *E05C 1/06* (2013.01)

(58) Field of Classification Search
CPC ............. Y10T 292/102; Y10T 292/096; Y10T 292/1014; Y10T 292/0969;
(Continued)

(56) References Cited

U.S. PATENT DOCUMENTS 416,181 A * 12/1889 O'Keefe ................. E05B 63/20 70/151 R
1,085,016 A * 1/1914 Calvert ................... E05B 55/00 70/150
(Continued)

FOREIGN PATENT DOCUMENTS

CH 384400 A * 5/1961 ............. E05B 55/00
DE 366761 C 1/1923
(Continued)

*Primary Examiner* — Kristina R Fulton
*Assistant Examiner* — Steven A Tullia
(74) *Attorney, Agent, or Firm* — Dilworth & Barrese, LLP

(57) ABSTRACT

A locking device (1), comprising:—a latch bolt arrangement (2), which is movable into at least a first and a second latch bolt position, said latch bolt arrangement (2) comprising a first follower arm engagement part (7); —a first follower arrangement (8) configured for transferring a motion to the latch bolt arrangement from a first unlocking device which can be connected to the first follower arrangement (8), wherein said first follower arrangement (8) comprises a first follower arm (11) which comprises a latch bolt engagement part (13) which is configured to at least in some positions of the first follower arm (11) contact the first follower arm engagement part (7) of the latch bolt arrangement (2), whereby the latch bolt arrangement (2) can be pushed by a movement of the first follower arm (11) such that the latch bolt arrangement (2) is moved from the first latch bolt position to the second latch bolt position; and —a locking arm (15), wherein said locking arm (15) further comprises a locking arm catch (19), whereby said locking arm (15) can be moved from the first locking arm position to the second locking arm position by pushing said locking arm catch (19), and wherein the first follower arm (11) further comprises a locking arm catch engagement part (21) which will push the locking arm catch (19) for moving the locking arm (15)
(Continued)

towards the second locking arm position when the first follower arm (11) is moved for pushing the latch bolt arrangement (2) to the second latch bolt position.

8 Claims, 5 Drawing Sheets

(58) Field of Classification Search
CPC ........... Y10T 292/0978; Y10T 292/098; Y10T 292/0982; E05B 55/00; E05B 55/005; E05B 55/12; E05C 1/06; E05C 1/00
See application file for complete search history.

(56) References Cited

U.S. PATENT DOCUMENTS

| | | | | | |
|---|---|---|---|---|---|
| 2,838,925 | A | * | 6/1958 | Backhouse | E05B 55/00 292/153 |
| 5,820,177 | A | * | 10/1998 | Moon | E05B 63/20 292/335 |
| 6,045,169 | A | | 4/2000 | Frolov | |
| 6,354,121 | B1 | * | 3/2002 | Frolov | E05B 47/0692 292/164 |
| 8,641,104 | B1 | * | 2/2014 | Tien | E05B 63/16 292/244 |

FOREIGN PATENT DOCUMENTS

| | | | | | |
|---|---|---|---|---|---|
| DE | 4118455 | A | * | 12/1991 | E05B 65/1086 |
| DE | 4118455 | A1 | | 12/1991 | |
| EP | 0682167 | A1 | * | 4/1995 | E05B 55/12 |
| EP | 0670403 | A2 | | 9/1995 | |
| EP | 0682167 | A1 | | 11/1995 | |
| EP | 1079054 | A1 | | 2/2001 | |
| EP | 1353028 | A1 | * | 10/2003 | E05B 63/202 |
| EP | 1353028 | A1 | | 10/2003 | |
| EP | 2813648 | A2 | | 12/2014 | |
| EP | 3208407 | A1 | * | 8/2017 | E05B 47/0046 |
| GB | 05417 | A | | 6/1911 | |
| GB | 597983 | A | | 2/1948 | |
| GB | 782916 | A | * | 11/1954 | E05B 55/00 |
| WO | WO-0012851 | A2 | * | 3/2000 | E05B 55/06 |

* cited by examiner

LOCKING DEVICE

TECHNICAL FIELD OF THE INVENTION

The present invention relates to a locking device.

BACKGROUND

The unlocking of a locked state in a locking device often requires that a locking arm which is blocking a movement of a latch bolt of the locking device first is removed before the latch bolt can be pushed for opening the door. These two activities for unlocking the locking device often requires a number of different parts inside the locking device.

In many locking devices a locked state can be unlocked from a handle connected to the locking device, i.e. a handle of for example a door where the locking device is provided. Hereby a locked state of the locking device can be released by pushing the handle. This is suitable in many doors where for example a safe exit out through the door always need to be assured. Hereby, often only a handle on the inside of the door is connected to the locking mechanism for unlocking a locked state and a handle provided on the outside of the door is normally not connected to the locking mechanism whereby a key is needed for unlocking a locked state of the locking device from outside the door or another type of authorized opening, for example electrical by any kind of code, tag or identification through the outside handle. A problem with this type of locking devices is that when pressing the handle on the inside of the door for unlocking the locked state a locking arm which is blocking a movement of a latch bolt of the locking device first needs to be removed before the latch bolt can be pushed for opening the door. Many separate cooperating parts inside the locking device are normally provided for achieving this function. Hereby a first part of a handle turn for opening the door will only remove the locking arm. It may be difficult to provide enough force to open the door during the rest of the handle turning.

SUMMARY

An object of the present invention is to provide an improved locking device.

A further object of the present invention is to provide a locking device with few parts and improved user unlocking experience.

This is achieved in a locking device according to claim 1.

According to the invention a locking device is provided, comprising:

- a latch bolt arrangement, which is movable into at least a first and a second latch bolt position, said latch bolt arrangement comprising a first follower arm engagement part;
- a first follower arrangement (8) configured for transferring a motion to the latch bolt arrangement from a first unlocking device connected to the first follower arrangement (8), wherein said first follower arrangement (8) comprises a first follower arm (11) which comprises a latch bolt engagement part (13) which is configured to at least in some positions of the first follower arm (11) contact the first follower arm engagement part (7) of the latch bolt arrangement (2), whereby the latch bolt arrangement (2) can be pushed by a movement of the first follower arm (11) such that the latch bolt engagement part (13) pushes the first follower arm engagement part (7) such that the latch bolt arrangement (2) is moved from the first latch bolt position to the second latch bolt position; and
- a locking arm (15) comprising a blocking part (17) which locking arm (15) can be positioned in at least two locking arm positions wherein in a first locking arm position the blocking part (17) locks the latch bolt arrangement (2) in the first latch bolt position and in a second locking arm position the blocking part (17) does not lock the latch bolt arrangement (2),
- wherein said locking arm (15) further comprises a locking arm catch (19), whereby said locking arm (15) can be moved from the first locking arm position to the second locking arm position by pushing said locking arm catch (19), and wherein the first follower arm (11) further comprises a locking arm catch engagement part (21) which will push the locking arm catch (19) for moving the locking arm (15) towards the second locking arm position when the first follower arm (11) is moved for pushing the latch bolt arrangement (2) to the second latch bolt position,
- wherein said locking device further comprising a second follower arrangement (30) configured for transferring a movement of a second unlocking device to the first follower arm (11) of the locking device (1), wherein said second unlocking device is a device which can be connected to the second follower arrangement (30) for unlocking the locking device,
- wherein said second follower arrangement (30) comprises a second follower arm (31) which comprises a first follower arm engagement part (33) which at least in some positions of the second follower arm is in contact with a second follower arm engagement part (35) of the first follower arm (11) for transfer of a motion of the second unlocking device through the second follower arm (31) to the first follower arm (11) for transferring the latch bolt arrangement (2) from the first latch bolt position to the second latch bolt position.

Hereby, with a locking device according to the invention, both a displacement of the blocking part of the locking arm to a position where it does not lock the latch bolt arrangement in the first latch bolt position, i.e. moving the locking arm from the first locking arm position to the second locking arm position, and the movement of the latch bolt arrangement from the first latch bolt position to the second latch bolt position is provided directly from the first follower arm, i.e. without other interconnecting parts. Hereby a movement of the first follower arm is directly transferred to both the locking arm and the latch bolt arrangement. Hereby a locking device with few parts is provided and furthermore a locking device is provided where the movement of the latch bolt arrangement is started directly without the need for a separate previous step of releasing a locking arm. If a limited rotational movement can be provided from outside the locking device, for example if a handle should be turned for unlocking the locking device it is suitable that the actual movement of the latch bolt takes place from the beginning of the rotation instead of wasting a first part of the rotation for removing the locking arm before the actual movement of the latch bolt can begin. Hereby, if the first follower arrangement comprises a cylinder and the second follower arrangement is configured for connecting to a handle the locking device can be easily unlocked by turning the handle and the unlocking experience by the user will be improved because of the direct action from the first follower arm on the latch bolt arrangement for moving it from the first to the second position.

In one embodiment of the invention the locking arm will be moved from the first locking arm position to the second locking arm position and the latch bolt arrangement will be moved from the first latch bolt position to the second latch bolt position by direct contact from the first follower arm whereby a movement of the first follower arm is directly transferred to a motion of both the locking arm and the latch bolt arrangement. Hereby no additional interconnecting parts are needed between the first follower arm and the latch bolt arrangement and the locking arm. Hereby a locking device comprising few parts is achieved and furthermore an efficient and direct transfer of the motion of the first follower arm to both the latch bolt arrangement and the locking arm at the same time can be provided.

In one embodiment of the invention a play is provided between the blocking part and the latch bolt arrangement in the first locking arm position such that a first movement of the latch bolt arrangement within the play is allowed before the locking arm catch has been pushed enough for moving the locking arm to the second locking arm position. Hereby a substantially simultaneous start of the pushing actions on both the latch bolt arrangement and the locking arm from the first follower arm is possible. The latch bolt arrangement can start to move within the play while the locking arm catch is started to being pushed by the locking arm catch engagement part.

In one embodiment of the invention the play is between 0.3-5 mm or between 0.5-3 mm.

In one embodiment of the invention, the locking arm catch engagement part will start to push the locking arm catch for moving the locking arm towards the second locking arm position and the latch bolt engagement part of the first follower arm will start to push the first follower arm engagement part of the latch bolt arrangement for moving the latch bolt arrangement towards the second latch bolt position substantially at the same time with a possible small time difference as allowed by the play between the blocking part and the latch bolt arrangement. These two pushing actions are started when the first follower arm is moved for pushing the latch bolt arrangement to the second latch bolt position. Hereby the movement of the locking arm is started at substantially the same time as the latch bolt arrangement is starting to move from the first latch bolt position to the second latch bolt position. A movement of the first follower arm will at substantially the same time both start to push the locking arm catch of the locking arm and the first follower arm engagement part of the latch bolt arrangement. This is possible because of the play that is left between the blocking part and the latch bolt arrangement when the latch bolt arrangement is provided in the first latch bolt position and the locking arm is provided in the first locking arm position, i.e. a locking position. This simultaneous movement is suitable both because fewer parts are needed within the locking device and because if a limited rotational movement can be provided from outside the locking device, for example if a handle should be turned for unlocking the locking device it is suitable that the actual movement of the latch bolt takes place from the beginning of the rotation instead of wasting a first part of the rotation for removing the locking arm before the actual movement of the latch bolt can begin.

In one embodiment of the invention the first follower arrangement comprises a cylinder follower and said second unlocking device is a handle connected to the second follower arrangement, whereby a turn of the handle is translated to a movement of the second follower arm which is directly transferred to a movement of the first follower arm.

In one embodiment of the invention said locking arm catch engagement part is in contact with the locking arm catch when the latch bolt arrangement is locked in the first latch bolt position by the blocking part while at the same time the latch bolt engagement part of the first follower arm is in contact with the first follower arm engagement part of the latch bolt arrangement.

In one embodiment of the invention said locking arm is pivotally arranged in the locking device and a spring is provided to the locking arm, wherein this spring urges the locking arm into the first locking arm position, and wherein geometries of the locking arm catch and the locking arm catch engagement part are configured such that when the first follower arm is moved for pushing the latch bolt arrangement to the second latch bolt position, the blocking part is kept pushed down by the locking arm catch engagement part until the latch bolt arrangement has passed the blocking part and the latch bolt arrangement can rest on a resting surface of the locking arm.

In one embodiment of the invention the first follower arrangement comprises a cylinder follower and the first follower arm which are connected to each other such that a counter clockwise rotational motion of the cylinder follower is transferred to a motion of the first follower arm for pushing the latch bolt arrangement to the second latch bolt position and hereby unlocks the locking device.

DETAILED DESCRIPTION OF EMBODIMENTS

Figure 1A:
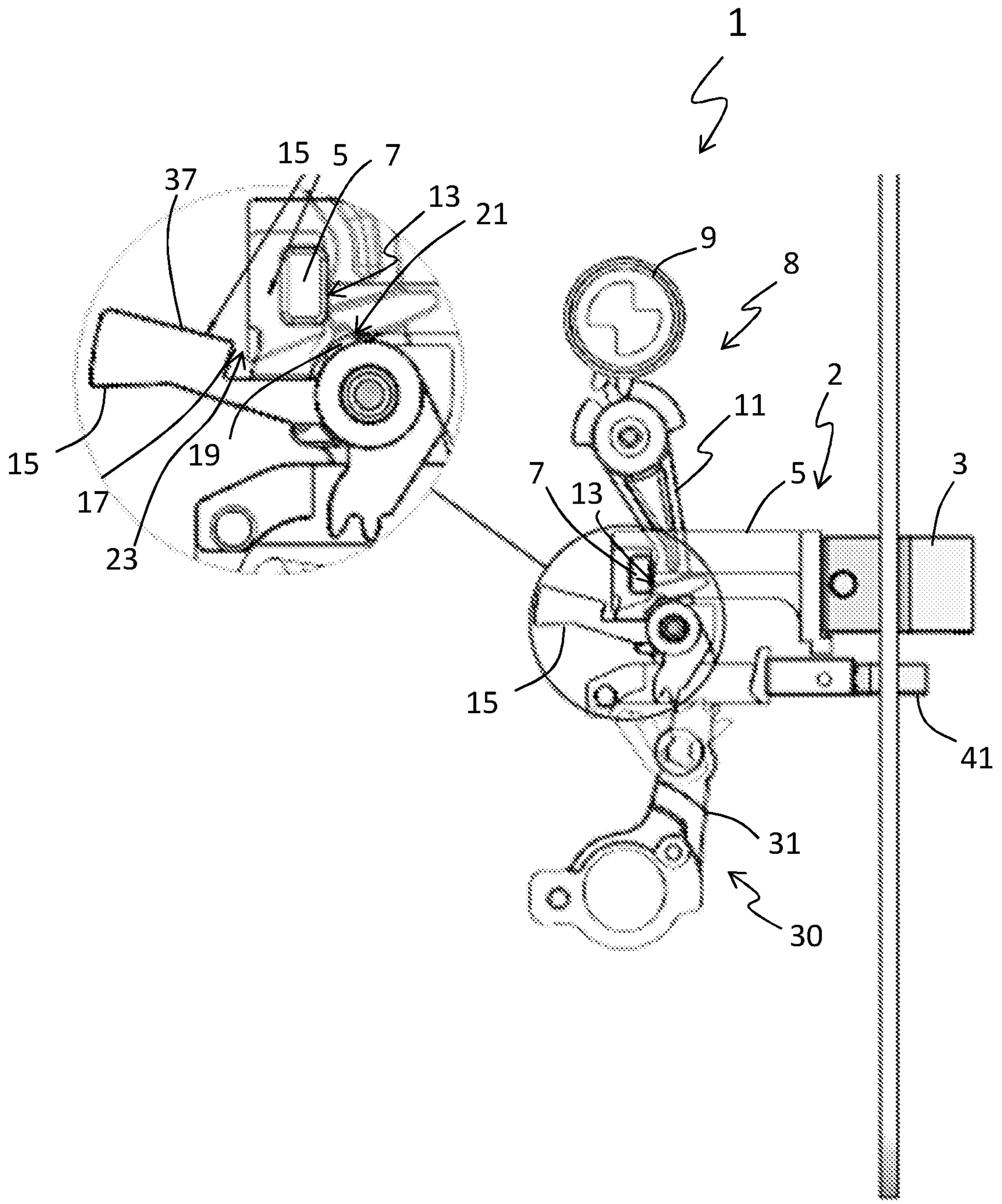
FIGS. 1*a*-1*c* are side views of a locking device with some parts shown transparent according to one embodiment of the invention in three different positions.
Figure 1B:
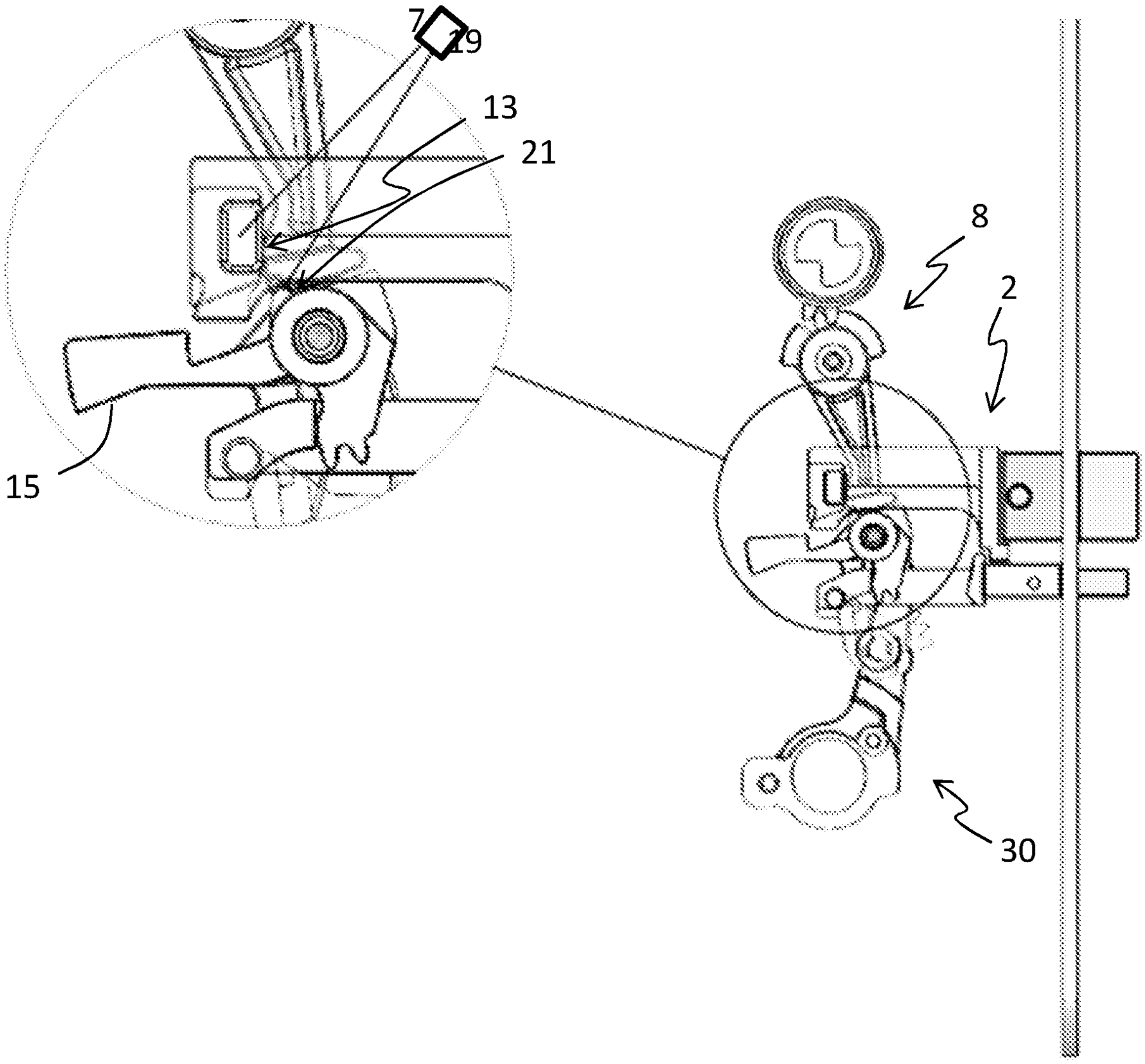
Figure 1C:
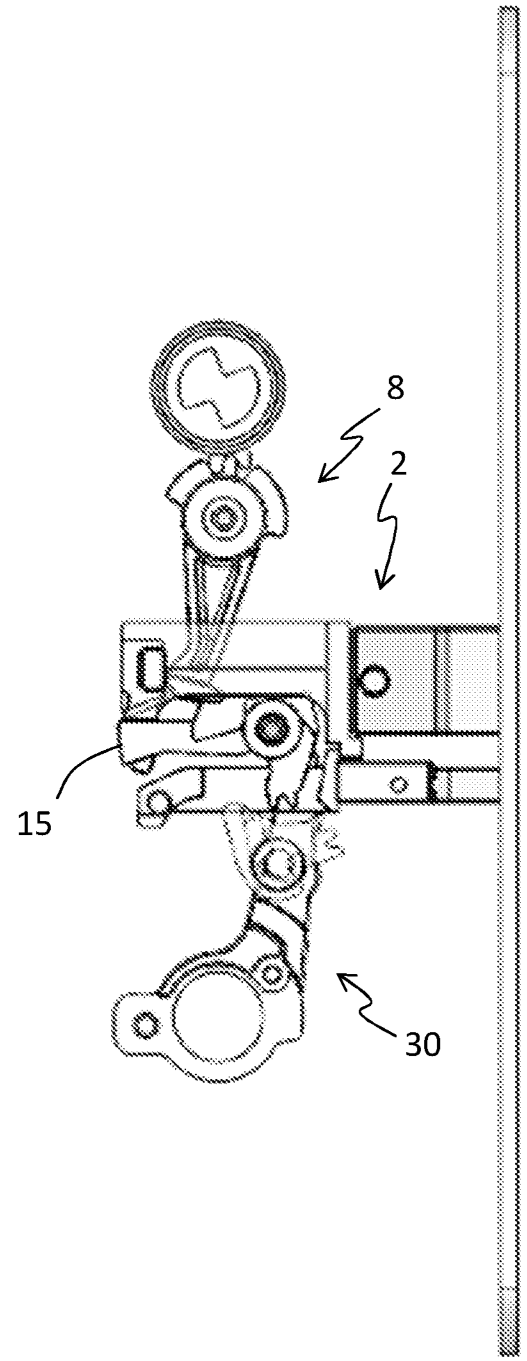
Figure 2:
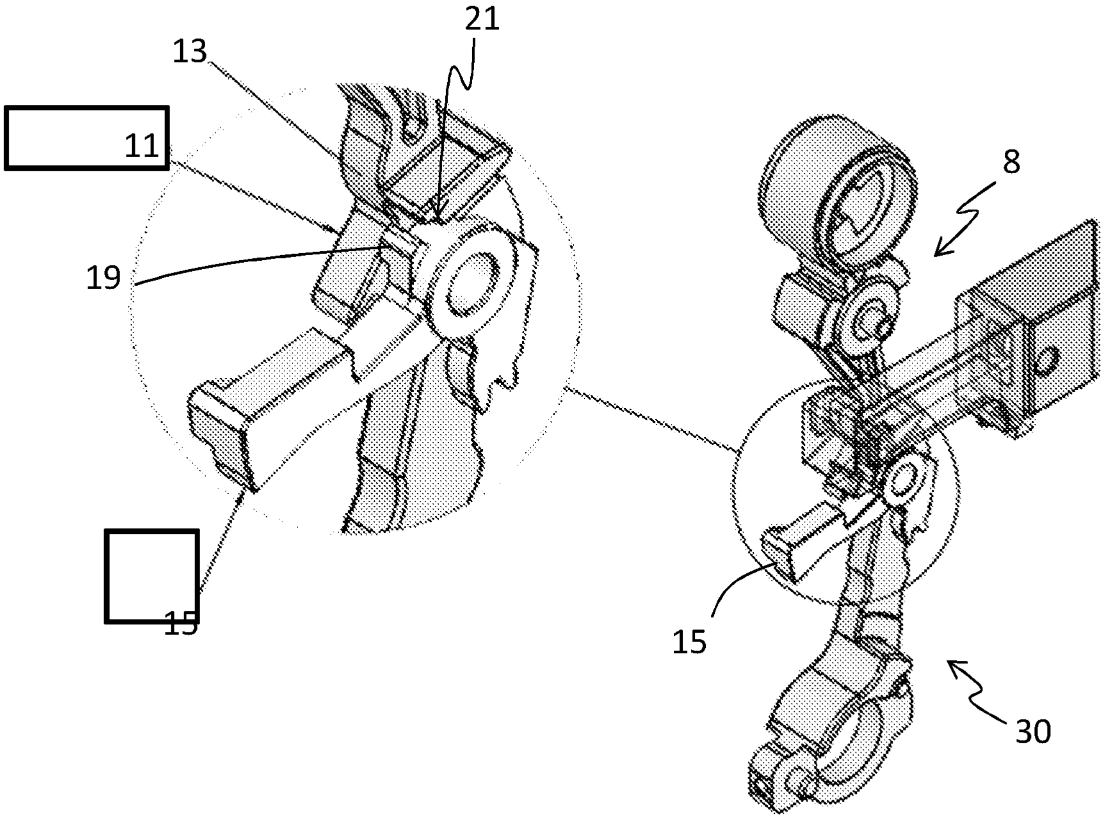
FIG. 2 is a perspective view showing some of the parts of the locking device as shown in FIGS. 1*a-c*.

A locking device 1 according to one embodiment of the invention is illustrated in FIGS. 1-3. Some of the details may be varied and still be encompassed by the invention which will be further described below in relation to each specific detail.

Figure 3A:
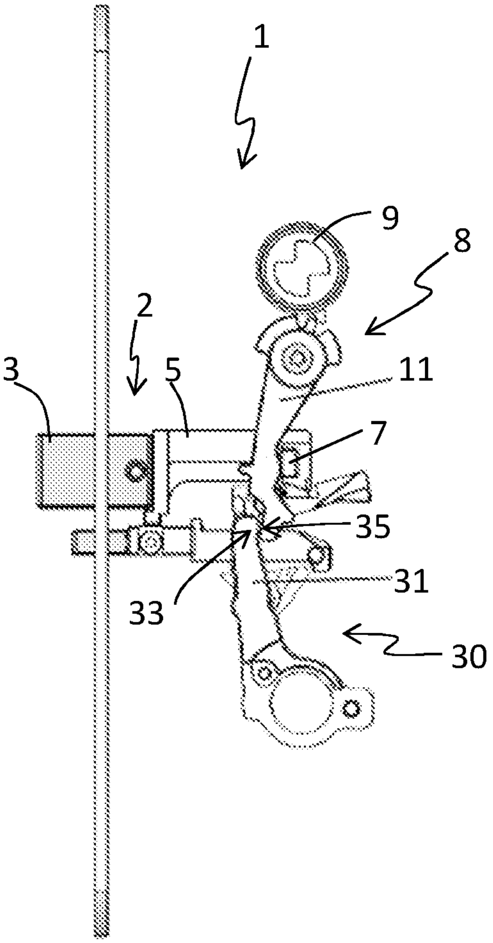
FIGS. 3*a*-3*b* are side views of the same locking device as shown in FIGS. 1*a*-1*c* in two different positions but from the opposite side.
Figure 3B:
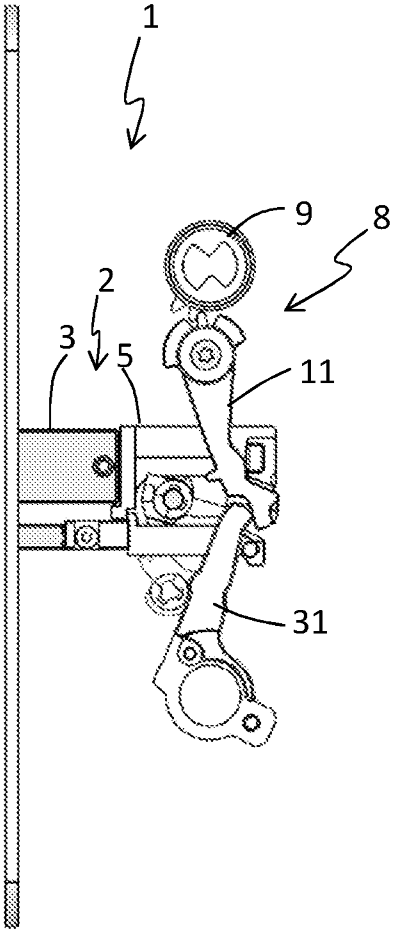

FIGS. 1*a*-1*c* show the locking device 1 in three different positions where FIG. 1*a* shows a locked position, FIG. 1*b* the start of unlocking the locking device and FIG. 1*c* an unlocked position. FIG. 2 is a perspective view showing some of the parts of the locking device 1 as shown in FIGS. 1*a-c*. FIG. 3*a* is the same position as FIG. 1*a*, i.e. a locked position, but from the opposite side of the locking device 1 and FIG. 3*b* is the same position as FIG. 1*c*, i.e. an unlocked position, but from the opposite side of the locking device 1.

The locking device 1 comprises a latch bolt arrangement 2, which is movable into at least a first and a second latch bolt position. The first latch bolt position is shown in FIGS. 1*a* and 3*a* and can be a locked position. In FIGS. 1*a* and 3*a* it is a locked position because a locking arm 15 of the locking device 1 is provided in a position for locking the latch bolt arrangement in the first position. In many locking devices a second latch 41 is also provided in the locking device and said second latch 41 is also connected to the locking arm 15 and can control a locked or unlocked state.

This is previously known and will not be described in further detail here. The second latch bolt position is shown in FIGS. 1*c* and 3*b* and is an unlocked position.

The latch bolt arrangement 2 can comprise a separate latch bolt 3 connected to a latch bolt fixture 5 as shown in FIGS. 1-3. However these two components could as well be one and the same component. Furthermore the latch bolt arrangement 2 can comprise an extended deadlocked latch bolt.

The latch bolt arrangement 2 comprises a first follower arm engagement part 7. In the embodiment shown in FIGS. 1-3 the latch bolt fixture 5 comprises the first follower arm engagement part 7 as a protrusion extending from the latch bolt fixture 5 for being pushed on for moving the latch bolt arrangement from the first to the second latch bolt position.

The locking device 1 comprises furthermore a first follower arrangement 8 configured for transferring a motion to the latch bolt arrangement 2 from a first unlocking device which can be connected to the first follower arrangement 8. The first unlocking device can be for example a key or a knob. However in one embodiment of the invention the first unlocking device can also be a handle which will be further described below. Other types of electrical unlocking processes are also possible, whereby unlocking of the locking device can be provided through an authorization for example by a code or a tag.

The first follower arrangement 8 comprises a first follower arm 11. In the locking device 1 as shown in FIGS. 1-3 the first follower arrangement 8 also comprises a cylinder follower 9 which is connected to the first follower arm 11 for example through gears or another connection for transferring a movement such that a counter clockwise rotational motion of the cylinder follower 9 is transferred to a motion of the first follower arm 11 for pushing the latch bolt arrangement 2 to the second latch bolt position hereby unlocking the locking device. Hereby, in this embodiment of the invention the first follower arrangement 8 comprises a separate cylinder follower 9 for transferring a rotational motion of for example a key to a motion of the first follower arm 11. However, the cylinder follower 9 can as well be an integrated part in the first follower arm 11 instead of being a separate part as shown in FIGS. 1-3. However, when the cylinder follower 9 is provided as a separate part connected to the first follower arm 11 as described above a counter clockwise rotation of a key can provide the unlocking of the locking device which may be preferred.

The first follower arm 11 comprises a latch bolt engagement part 13 which is configured to at least in some positions of the first follower arm 11 contact the first follower arm engagement part 7 of the latch bolt arrangement 2. Hereby the latch bolt arrangement 2 can be pushed by a movement of the first follower arm 11 such that the latch bolt arrangement 2 is moved from the first latch bolt position to the second latch bolt position. The latch bolt engagement part 13 is a surface of the first follower arm 11 which surface will contact the first follower arm engagement part 7 in some positions of the first follower arm 11. A movement of the first follower arm 11 will cause the latch bolt engagement part 13 to push the latch bolt arrangement 2 from the first position to the second position and the latch bolt engagement part 13 will contact the first follower engagement part 7 and push it during this movement. The latch bolt engagement part 13 can be best seen in FIG. 2.

The locking device 1 comprises furthermore a locking arm 15 comprising a blocking part 17. The locking arm 15 can be positioned in at least two locking arm positions wherein in a first locking arm position the blocking part 17 locks the latch bolt arrangement 2 in the first latch bolt position and in a second locking arm position the blocking part 17 does not lock the latch bolt arrangement 2. The first locking arm position is shown in FIGS. 1*a* and 3*a* and the second locking arm position is shown in FIGS. 1*c* and 3*b*. The blocking part 17 of the locking arm 15 is in this embodiment provided as a lip which when provided directly behind the latch bolt arrangement 2, i.e. when the locking arm is in its first position, will prevent movement from the first latch bolt position of the latch bolt arrangement 2. A play 23 is furthermore provided between the blocking part 17 and the latch bolt arrangement 2 when the locking arm is in the first locking arm position which will be further described below.

The locking arm 15 further comprises a locking arm catch 19, whereby said locking arm 15 can be moved from the first locking arm position to the second locking arm position by pushing said locking arm catch 19. The locking arm catch 19 can best be seen in FIG. 2 but also in FIG. 1*b*.

The first follower arm 11 comprises furthermore according to the invention a locking arm catch engagement part 21 which is best seen in FIG. 2. When the first follower arm 11 is moved for pushing the latch bolt arrangement 2 to the second latch bolt position the locking arm catch engagement part 21 will start to push the locking arm catch 19 for moving the locking arm 15 towards the second locking arm position substantially at the same time as the latch bolt engagement part 13 of the first follower arm 11 starts to push the first follower arm engagement part 7 of the latch bolt arrangement 2 for moving the latch bolt arrangement 2 towards the second latch bolt position. When the latch bolt arrangement 2 is locked in the first latch bolt position by the blocking part 17 the locking arm catch engagement part 21 can suitably be in contact with the locking arm catch 19 while at the same time the latch bolt engagement part 13 of the first follower arm 11 is in contact with the first follower arm engagement part 7 of the latch bolt arrangement 2.

For allowing this direct start of movement of the latch bolt arrangement without a first displacement of the locking arm a play 23 is provided between the blocking part 17 and the latch bolt arrangement 2 in the first locking arm position. Hereby a first movement of the latch bolt arrangement 2 within the play 23 is allowed before the locking arm catch 19 has been pushed enough by the locking arm catch engagement part 21 for moving the locking arm 15 to the second locking arm position. The play 23 can suitably be a few millimeters, such as for example between 0.3-5 mm or between 0.5-3 mm. Hereby the latch bolt arrangement 2 can even be started to be pushed towards the second position slightly before the locking arm is released from blocking the movement. Alternatively these to activities are started simultaneously or substantially simultaneously. This is in contrast to prior art where the locking arm has been released before a movement of the latch bolt arrangement has been allowed.

The simultaneous, or substantially simultaneous, start of pushing of the locking arm and movement of the latch bolt arrangement provides an improved unlocking process. This unlocking can for example be performed by a first unlocking device such as for example a key, a knob or a handle connected to the first follower arrangement 8 or alternatively by a second unlocking device such as for example a key, a knob or a handle connected to a second follower arrangement 30 which will be described further below. The turning of the key, the knob or the handle for unlocking the locking device will thanks to the invention in both situations be facilitated. When both the pushing of the locking arm and movement of the latch bolt arrangement starts from the beginning of the turning activity where less force is needed the unlocking experience and efficiency will be improved. Especially when a handle is turned for unlocking the locking device the first part of the turning is easiest to turn, i.e. requires less force and therefore the unlocking of this locking device according to the invention is easier than in prior art.

Furthermore the locking device 1 according to the invention comprises few parts compared to prior art devices. This is suitable for many reasons, for example for production and maintenance efficiency.

In some embodiments of the invention the locking arm 15 is pivotally arranged in the locking device 1 and a spring is provided to the locking arm 15. This spring urges the locking arm 15 into the first locking arm position. Geometries of the locking arm catch 19 and the locking arm catch engagement part 21 are configured such that when the first follower arm 11 is moved for pushing the latch bolt arrangement 2 to the second latch bolt position, the blocking part 17 is kept pushed down by the locking arm catch engagement part 21 until the latch bolt arrangement 2 has passed the blocking part 17 and the latch bolt arrangement 2 can rest on a resting surface 37 of the locking arm.

In the embodiment of the invention as shown in FIGS. 1-3, but not necessarily, the locking device 1 comprises a second follower arrangement 30 configured for transferring a movement of a second unlocking device to the first follower arm 11 of the locking device 1. The second unlocking device is a device which can be connected to the second follower arrangement 30 for unlocking the locking device. This can be a key, a knob or a handle. Other types of electrical unlocking processes are also possible, whereby unlocking of the locking device can be provided through an authorization for example by a code or a tag. In the embodiment as shown in FIGS. 1-3 it can suitably be a handle and the first unlocking device can suitably be a key or a knob for turning the cylinder. If the second unlocking device is a handle this can be a handle on the inner side of a door. A handle on the outer side of the door can then suitably be connected selectively such that the locking device only can be unlocked from outside when an authorization has been recognized for example by a tag or a code. The second follower arrangement 30 comprises a second follower arm 31 which comprises a first follower arm engagement part 33 which at least in some positions of the second follower arm 31 is in contact with a second follower arm engagement part 35 of the first follower arm 11 for transfer of a motion of the second unlocking device through the second follower arm 31 to the first follower arm 11 for transferring the latch bolt arrangement 2 from the first latch bolt position to the second latch bolt position. This can best be seen in FIGS. 3*a* and 3*b*.

In some embodiments the first follower arrangement 8 comprises a cylinder follower. The cylinder follower can be a part of the first follower arm 11 or be a separate part as shown in FIGS. 1-3. In the embodiment as shown in FIGS. 1-3 the first follower arrangement 8 comprises the cylinder follower 9 and the first follower arm 11 which are connected to each other for example through gears or another connection for transferring a movement such that a counter clockwise rotational motion of the cylinder follower 9 is transferred to a motion of the first follower arm 11 for pushing the latch bolt arrangement 2 to the second latch bolt position, i.e. unlocks the locking device. If a clockwise rotation of the cylinder follower can be used for unlocking the locking device the cylinder follower 9 can instead be integrated into the first follower arm 11.

In the embodiment as shown in FIGS. 1-3 the first unlocking device is a key or a knob which can be connected to the cylinder follower 9 of the first follower arrangement 8 and the second unlocking device is a handle connected to the second follower arrangement 30, whereby a turn of the handle is translated to a movement of the second follower arm 31 which is transferred to a movement of the first follower arm 11. By this arrangement a turn of a handle can be transferred directly to a first follower arm 11, also called a cylinder arm, which will unlock the locking device 1 as explained above, i.e. by simultaneously push the locking arm and the latch bolt arrangement. Hereby the locking device can be easily unlocked by the handle and a door comprising said locking device 1 can be easily opened.

In another embodiment of the invention the first follower arm 11 is a handle follower arm and the second follower arm 31 is a cylinder follower arm and the first unlocking device is a handle connected to the first follower arm 11, whereby a turn of the handle is translated to a movement of the first follower arm 11 and whereby a movement of a second unlocking device is transferred through the second follower arm 31 directly to a movement of the first follower arm 11.

Different combinations of first follower arms and second follower arms as cylinder follower arms and handle follower arms and different configurations of latch bolt arrangements and different designs of locking arms are covered in this invention where the invention is the direct transfer of a movement of the first follower arm to both the latch bolt arrangement and the locking arm. Hereby a direct start of movement of the latch bolt arrangement when the locking device is unlocked is provided, i.e. a substantially simultaneous start of pushing the latch bolt arrangement from a first position to a second position and a start of releasing the locking arm from blocking this movement. When these two actions are started substantially at the same time the unlocking process is improved.

The invention claimed is:

1. A locking device (1), comprising:

a latch bolt arrangement (2), which is movable into at least a first and a second latch bolt position, said latch bolt arrangement (2) comprising a first follower arm engagement part (7);

a first follower arrangement (8) configured for directly transferring motion to the latch bolt arrangement (2) from a first unlocking device connected to the first follower arrangement (8), wherein said first follower arrangement (8) comprises a first follower arm (11) which comprises a latch bolt engagement part (13) which is configured to at least in some positions of the first follower arm (11) contact the first follower arm engagement part (7) of the latch bolt arrangement (2), whereby the latch bolt arrangement (2) can be pushed by a movement of the first follower arm (11) such that the latch bolt engagement part (13) pushes the first follower arm engagement part (7) such that the latch bolt arrangement (2) is moved from the first latch bolt position to the second latch bolt position; and a locking arm (15) comprising a blocking part (17) which locking arm (15) can be positioned in at least two locking arm positions wherein in a first locking arm position the blocking part (17) locks the latch bolt arrangement (2) in the first latch bolt position and in a second locking arm position the blocking part (17) does not lock the latch bolt arrangement (2), wherein said locking arm (15) further comprises a locking arm catch (19), whereby said locking arm (15) can be moved from the first locking arm position to the second locking arm position by pushing said locking arm catch (19), the first follower arm (11) further comprises a locking arm catch engagement part (21) which will push the locking arm catch (19) for moving the locking arm (15) towards the second locking arm position when the first follower arm (11) is moved for pushing the latch bolt arrangement (2) to the second latch bolt position, said locking device further comprising a second follower arrangement (30) configured for transferring a movement of a second unlocking device to the first follower arm (11) of the locking device (1), said second unlocking device is a device which can be connected to the second follower arrangement (30) for unlocking the locking device, said second follower arrangement (30) comprises a second follower arm (31) which comprises a second first follower arm engagement part (33) which in some positions of the second follower arm (31) is in contact with a second follower arm engagement part (35) of the first follower arm (11) for transferring motion of the second unlocking device through the second follower arm (31) to the first follower arm (11) for transferring the latch bolt arrangement (2) from the first latch bolt position to the second latch bolt position, the first follower arrangement (8) comprises a cylinder follower (9) configured to act on the first follower arm (11), said second unlocking device is a handle connected to the second follower arrangement (30), whereby a turn of the handle is translated to a movement of the second follower arm (31) which is directly transferred to the movement of the first follower arm (11), and said first follower arrangement (8) is configured to act directly on the latch bolt arrangement (2) without engaging said second follower arrangement (30).

2. The locking device according to claim 1, wherein the locking arm (15) will be moved from the first locking arm position to the second locking arm position and the latch bolt arrangement (2) will be moved from the first latch bolt position to the second latch bolt position by direct contact from the first follower arm (11) whereby a movement of the first follower arm (11) is directly transferred to motion of both the locking arm (15) and the latch bolt arrangement (2).

3. The locking device according to claim 1, wherein a play (23) is provided between the blocking part (17) and the latch bolt arrangement (2) in the first locking arm position such that a first movement of the latch bolt arrangement (2) within the play (23) is allowed before the locking arm catch (19) has been pushed enough for moving the locking arm (15) to the second locking arm position.

4. The locking device according to claim 3, wherein the play (23) is between 0.3-5 mm or between 0.5-3 mm.

5. The locking device according to claim 3, wherein, when the first follower arm (11) is moved for pushing the latch bolt arrangement (2) to the second latch bolt position, the locking arm catch engagement part (21) will start to push the locking arm catch (19) for moving the locking arm (15) towards the second locking arm position and the latch bolt engagement part (13) of the first follower arm (11) will start to push the first follower arm engagement part (7) of the latch bolt arrangement (2) for moving the latch bolt arrangement (2) towards the second latch bolt position substantially at the same time with a possible small time difference as allowed by the play (23) between the blocking part (17) and the latch bolt arrangement.

6. The locking device according to claim 1, wherein said locking arm catch engagement part (21) is in contact with the locking arm catch (19) when the latch bolt arrangement (2) is locked in the first latch bolt position by the blocking part (17) while at the same time the latch bolt engagement part (13) of the first follower arm (11) is in contact with the first follower arm engagement part (7) of the latch bolt arrangement (2).

7. The locking device according to claim 1, wherein said locking arm (15) is pivotally arranged in the locking device (1) and a spring is provided to the locking arm (15), wherein this spring urges the locking arm (15) into the first locking arm position, and wherein geometries of the locking arm catch (19) and the locking arm catch engagement part (21) are configured such that when the first follower arm (11) is moved for pushing the latch bolt arrangement (2) to the second latch bolt position, the blocking part (17) is pushed down by the locking arm catch engagement part (21) until the latch bolt arrangement (2) passes the blocking part (17) and the latch bolt arrangement (2) rests on a resting surface (37) of the locking arm.

8. The locking device according to claim 1, wherein the first follower arrangement (8) comprises a cylinder follower (9) and the first follower arm (11) which are connected to each other such that a counter clockwise rotational motion of the cylinder follower (9) is transferred to motion of the first follower arm (11) for pushing the latch bolt arrangement (2) to the second latch bolt position and hereby unlocks the locking device.

* * * * *